United States Patent [19]
Chang

[11] Patent Number: 6,009,893
[45] Date of Patent: Jan. 4, 2000

[54] ASSEMBLING STRUCTURE FOR BALANCE VALVE OF COLD/HOT WATER MIXING VALVE

[76] Inventor: Chia-Bo Chang, No. 335, Chang-Ting Rd., Lukang Town, Changhua County, Taiwan

[21] Appl. No.: 09/199,802

[22] Filed: Nov. 25, 1998

[51] Int. Cl.[7] .................................................... E05D 11/03
[52] U.S. Cl. ........................... 137/98; 137/100; 137/315; 137/454.6
[58] Field of Search .............................. 137/98, 100, 114, 137/315, 454.6, 607, 625.4, 625.41

[56] References Cited

U.S. PATENT DOCUMENTS

| | | | |
|---|---|---|---|
| 4,901,750 | 2/1990 | Nicklas et al. | 137/607 |
| 5,010,917 | 4/1991 | Iqbal | 137/454.6 |
| 5,355,966 | 10/1994 | Marty et al. | 137/454.6 |

*Primary Examiner*—Stephen M. Hepperle
*Attorney, Agent, or Firm*—Dougherty & Troxell

[57] ABSTRACT

An assembling structure for balance valve of cold/hot water mixing valve, which includes a balance valve shade board for assembling a water pressure balance valve with the bottom of the mixing valve. A lower surface of the bottom wall of the mixing valve cartridge is formed with an upper balance valve cavity near the cold and hot water incoming holes. Two sides of the bottom wall of the cartridge are formed with latch holes. The balance valve shade board are also formed with a cold and a hot water incoming holes and a mixing water outgoing hole. An upper surface of the balance valve shade board is formed with a lower balance valve cavity near the cold and hot water incoming holes. The upper surface of the balance valve shade board is further formed with a sealing groove along the edges of the mixing water outgoing hole and the lower balance valve cavity. Two sides of the edge of the shade board are disposed with upward extending resilient latch hooks. The balance valve seal and the balance valve are assembled with each other and then together inserted into the sealing groove and lower balance valve cavity of the upper surface of the balance valve shade board. The resilient latch hooks of the shade board are latched in the latch holes of the peripheral wall of the cartridge, so that the balance valve shade board together with the seal and balance valve are secured on the lower surface of the bottom wall of the cartridge.

1 Claim, 8 Drawing Sheets

ASSEMBLING STRUCTURE FOR BALANCE VALVE OF COLD/HOT WATER MIXING VALVE

BACKGROUND OF THE INVENTION

The present invention relates to an assembling structure for balance valve of cold/hot water mixing valve, and more particularly to an assembling structure including a balance valve shade board for assembling a water pressure balance valve with the bottom of the mixing valve.

It is known that a conventional cold/hot water mixing valve is installed in a faucet and directly communicated with the water transferring passage of the cold/hot water. A pair of sealedly overlaid ceramic discs in the valve serve to mix the cold and hot water and adjust the amount of the water. However, in use, in the case that one of the cold and hot water passages fails to stably supply water, the water discharged from the faucet will be alternately cold and hot. Especially, in the case that the cold water is suddenly greatly reduced or shut off while the hot water is continuously supplied, high temperature hot water will flow out from the faucet. This may lead to burn of a user. In order to avoid such danger, generally prior to connection of the cold/hot water tubes with the mixing valve, the water tubes are first connected with a balance valve device. In the case that the water pressure in one of the water tubes suddenly changes, the balance valve serves to automatically shut off the water supply of the cold and hot water tubes so as to ensure safety.

FIG. 11 shows a conventional cold/hot water mixing valve device in which a balance valve is directly disposed on the bottom thereof. The mixing valve is composed of a cartridge 3', an upper bottom board 4' and a lower bottom board 5'. In the cartridge 3' are sequentially fitted a control lever device 31', a movable disc 32' and a fixed disc 33'. A seal 41' is fitted with the top face of the upper bottom board 4' with the insertion lugs 42' latched in the latch holes 35' of the bottom of the cartridge 3'. The upper bottom board 4' is formed with a cold and hot water hole 43' and a mixing water hole 44' respectively communicating with the cold and hot water hole 331' and mixing water hole 332' of the fixed disc. The upper bottom board 4' is further formed with an upper balance valve chamber 45' under the cold and hot water hole 43'. In addition, the lower bottom board 5' is also formed with a cold and hot water hole 53' and a mixing water hole 54' respectively communicating with the cold and hot water hole 43' and mixing water hole 44' of the upper bottom board. The lower bottom board 5' is further formed with a lower balance valve chamber 55' above the cold and hot water hole 53'. The lower and upper balance valve chamber 55', 45' together sealedly accommodate therein a balance valve 2'. After assembled, the cold and hot water passage is such that the water is sent in from the water incoming tube to flow through the water hole 53' of the lower bottom board and get into the space defined by the balance valve 2'. Then the water flows from the space through the water hole 43' of the upper bottom board and the water hole 331' of the fixed disc into the mixing chamber 321' of the movable disc. When the mixing chamber 321' is communicated with the water hole 332' of the fixed disc, the mixing water flows from the water hole 332' and through holes 44', 54' into the chamber of the faucet to discharge from the spout thereof.

According to the above arrangement, the balance valve and the mixing valve are assembled into an integral body so as to ensure safety in use of the water. However, the balance valve is accommodated in a space defined by multiple components including the cartridge, upper bottom board and lower bottom board. Therefore, these components must have relatively high precision for sealedly assembling the respective components. The higher precision leads to more difficulty in processing and increased cost of production. In addition, in order to ensure the sealing of the respective components, sealing rings are fitted between the components. In the case that any of the components is disaligned during the assembling procedure, the sealing characteristic will be lost. In addition, these components are assembled with each other by insertion, latching or screws. It is hard to ensure that the components are firmly connected with each other. In the case that any of these components is loosened, the sealing effect will be lost. In conclusion, it is difficult to reliably assemble the components of the above cold/hot water mixing valve and leakage often takes place at the connection between the components.

SUMMARY OF THE INVENTION

It is a primary object of the present invention to provide an assembling structure for balance valve of cold/hot water mixing valve, which is simplified and includes a balance valve shade board for directly assembling the balance valve with the bottom of the mixing valve cartridge. Accordingly, the assembling procedure of the components of the mixing valve is facilitated and the problems existing in the conventional device are eliminated.

The present invention can be best understood through the following description and accompanying drawings, wherein:

DETAILED DESCRIPTION OF THE PREFERRED EMBODIMENTS

Figure 1:
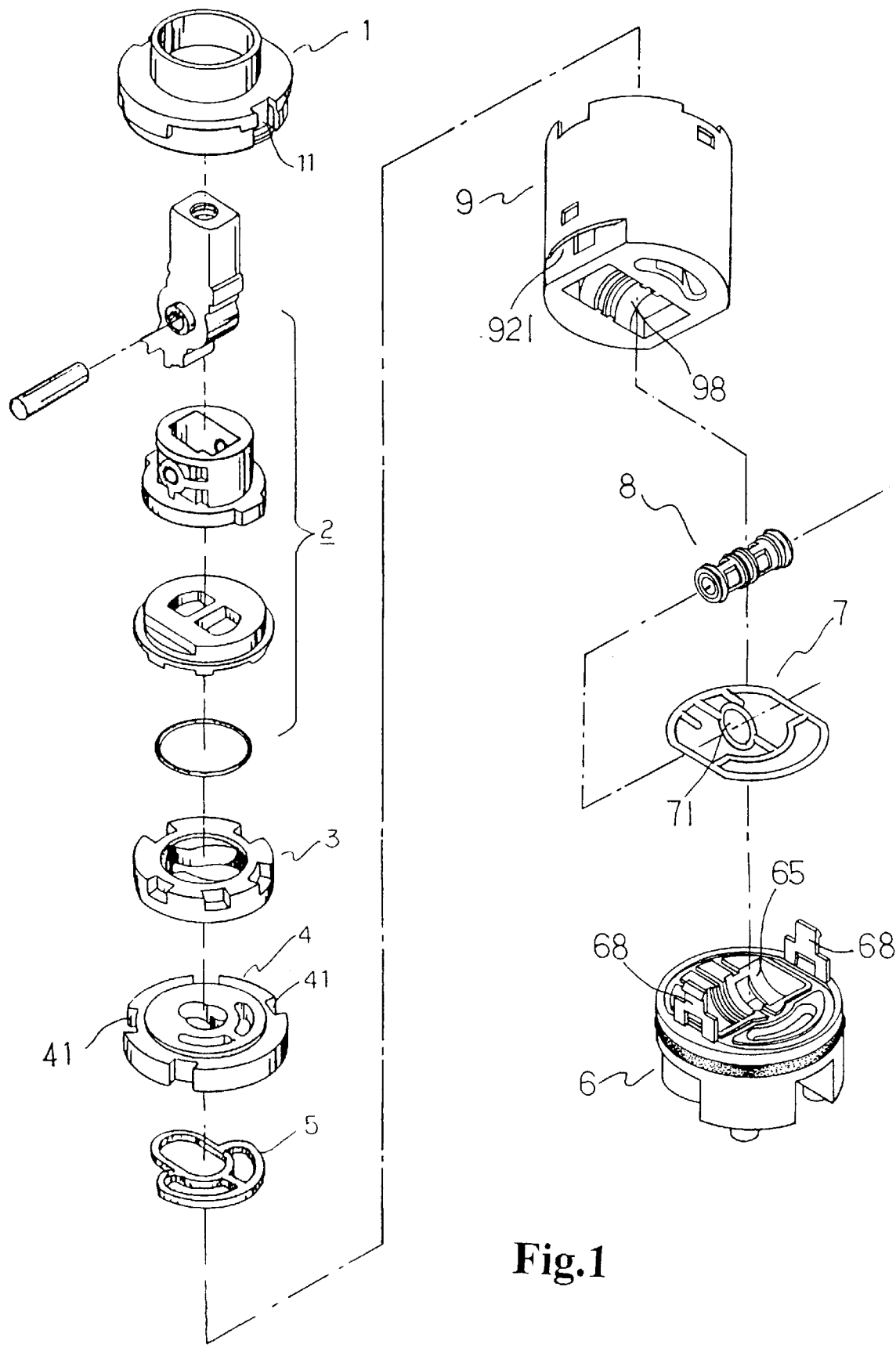
FIG. 1 is a perspective exploded view of the present invention.
Figure 2:
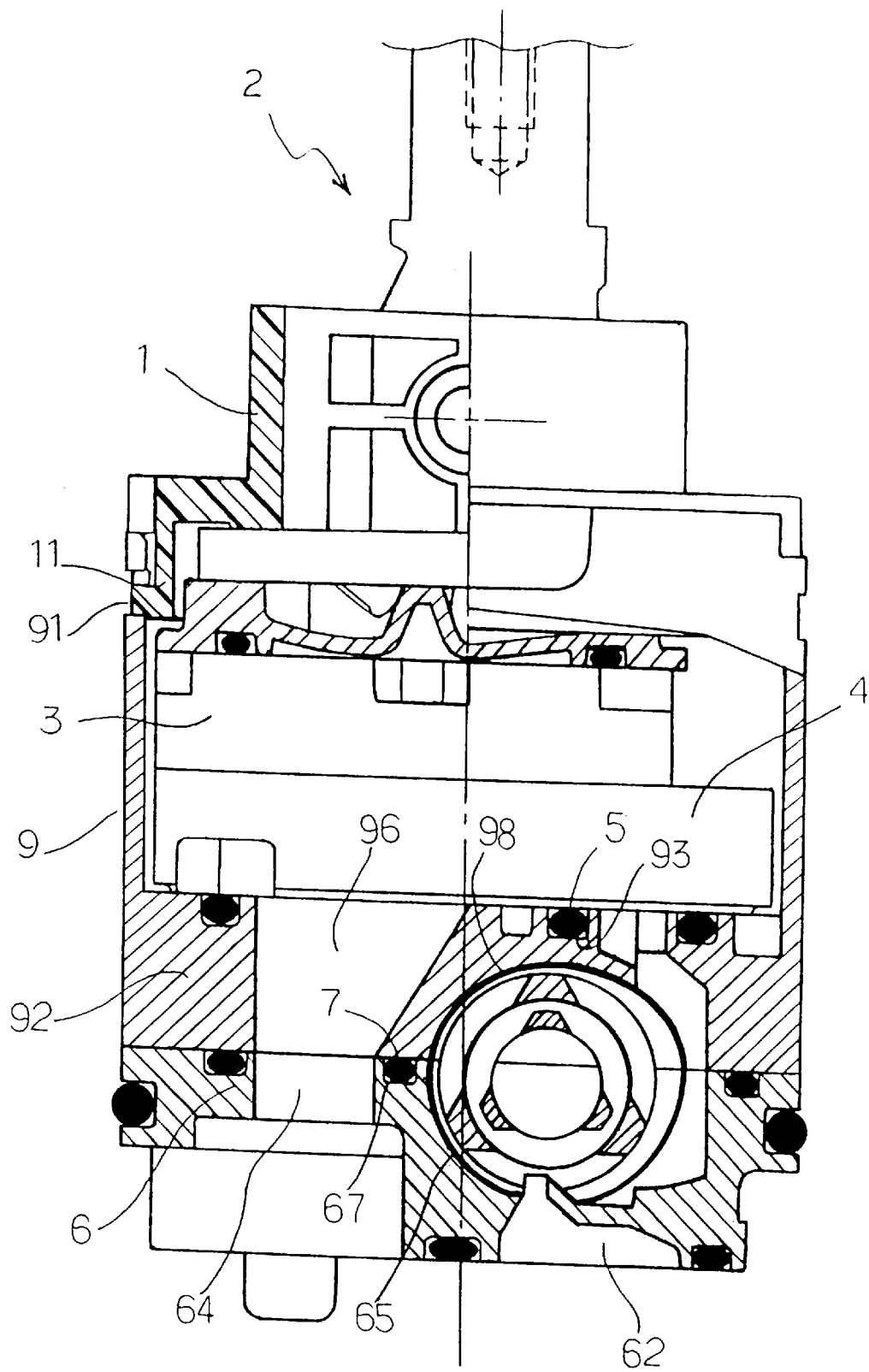
FIG. 2 is a sectional assembled view of the present invention, showing the connection between the components.
Figure 3:
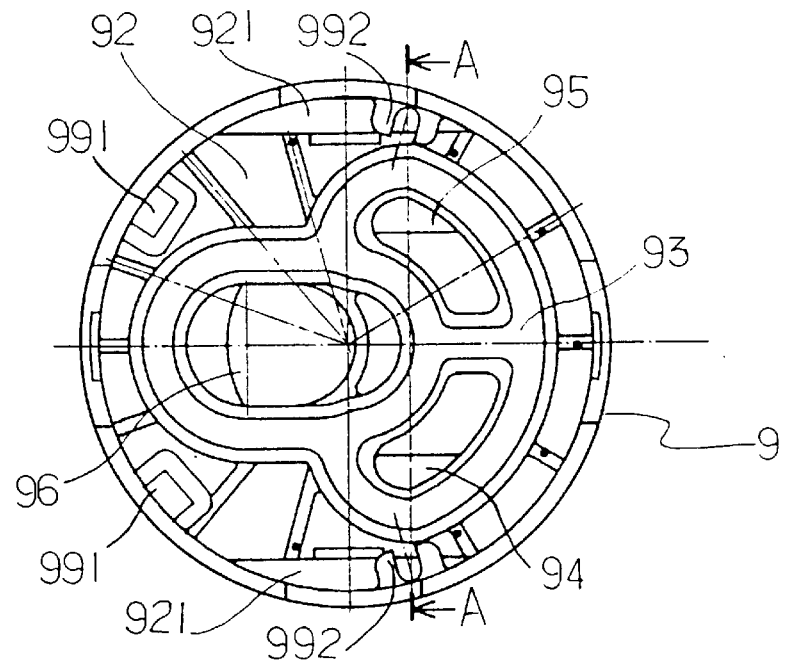
FIG. 3 is a top view of the cartridge of the present invention.
Figure 4:
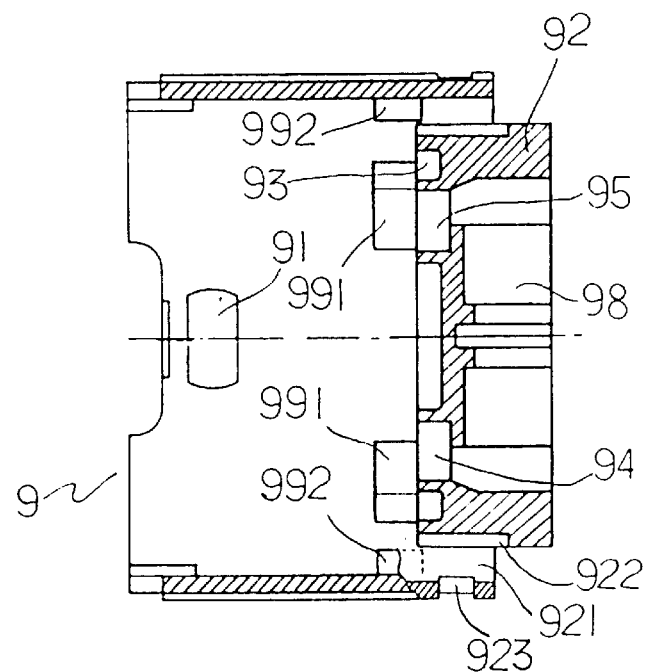
FIG. 4 is a sectional view taken along line A—A of FIG. 3.
Figure 5:
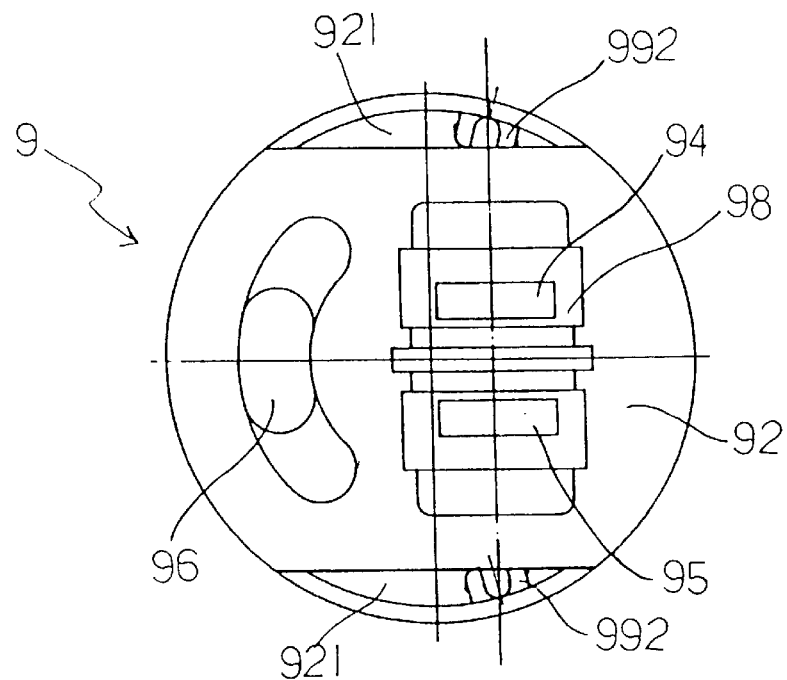
FIG. 5 is a bottom view of the cartridge of the present invention.

Please refer to FIGS. 1 and 2. The present invention includes a cartridge cap 1, a rocking lever control device 2 composed of a rocking lever, rocking lever seat, adapter cap and a seal, a movable disc 3, a fixed disc 4, a disc seal 5, a balance valve shade board 6, a balance valve seal 7, a balance valve 8 and a cartridge 9. The upper edge of the peripheral wall of the cartridge 9 is formed with latch holes 91 for latching with latch hooks 11 of the cartridge cap 1. Referring to FIGS. 3 and 4, the bottom wall 92 of the cartridge 9 is formed with a cold and a hot water incoming holes 94, 95 and a mixing water outgoing hole 96. The upper surface of the bottom wall 92 is formed with a disc sealing groove 93 along the peripheries of the water holes 94, 95, 96 and spaced from the edges of the water holes by a certain distance. Guide rails 991, 992 upward extend from the periphery of the bottom wall 92. In addition, as shown in FIG. 5, an upper balance valve cavity 98 is formed on lower surface of the bottom wall 92 near the cold and hot water incoming holes 94, 95. Two sides of the bottom wall 92 are respectively formed with two semilunar perforations 921. The lateral face of the bottom wall 92 at each perforation 921 is formed with a guide channel 922. The peripheral wall of the cartridge is formed with a latch hole 923 opposite to the guide channel.

Figure 6:
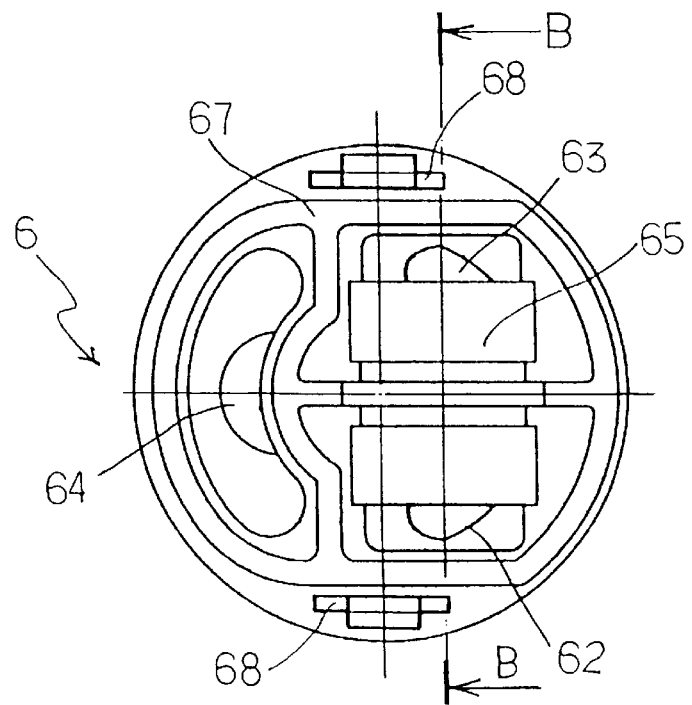
FIG. 6 is a top view of the balance valve shade board of the present invention.
Figure 7:
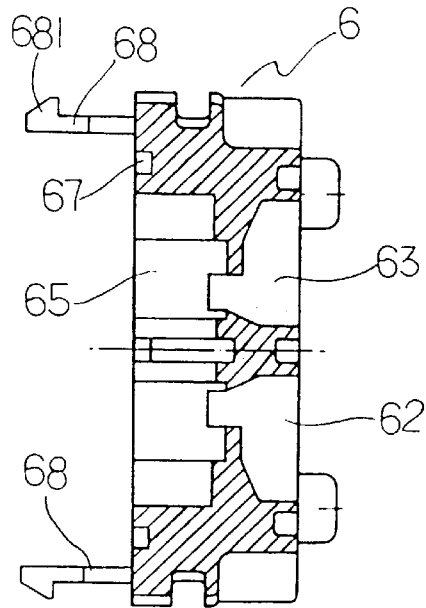
FIG. 7 is a sectional view taken along line B—B of FIG. 6.
Figure 8:
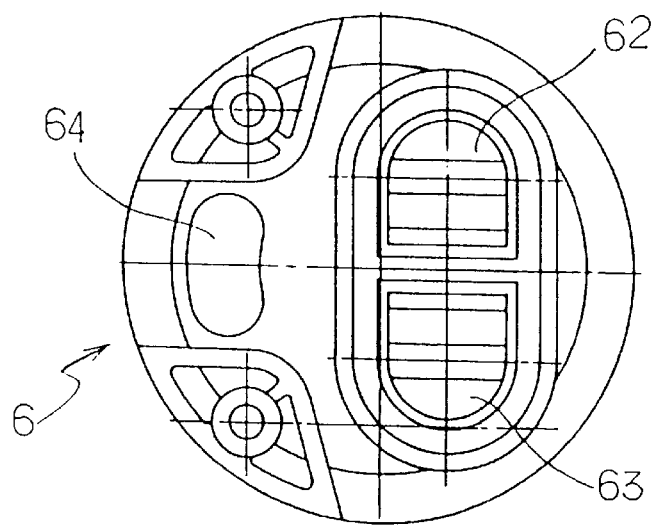
FIG. 8 is a bottom view of the balance valve shade board of the present invention.

Referring to FIGS. 6 to 8, the balance valve shade board 6 is formed with a cold and a hot water incoming holes 62, 63 and a mixing water outgoing hole 64 corresponding to the water holes of the bottom wall 92 of the cartridge 9. The upper surface of the balance valve shade board 6 is formed with a lower balance valve cavity 65 near the cold and hot water incoming holes 62, 63. In addition, the upper surface of the balance valve shade board 6 is formed with a sealing groove 67 along the edges of the mixing water outgoing hole 64 and the lower balance valve cavity 65. Two sides of the edge of the shade board are respectively disposed with two upward extending resilient latch hooks 68 each having an outward hook head 681 at free end. Through the guide channel 922, the latch hook 68 can be latched in the latch hole 923 to fit the shade board 6 in the semilunar perforation 921 and lock the shade board 6 under the lower surface of the bottom wall 92.

Figure 9:
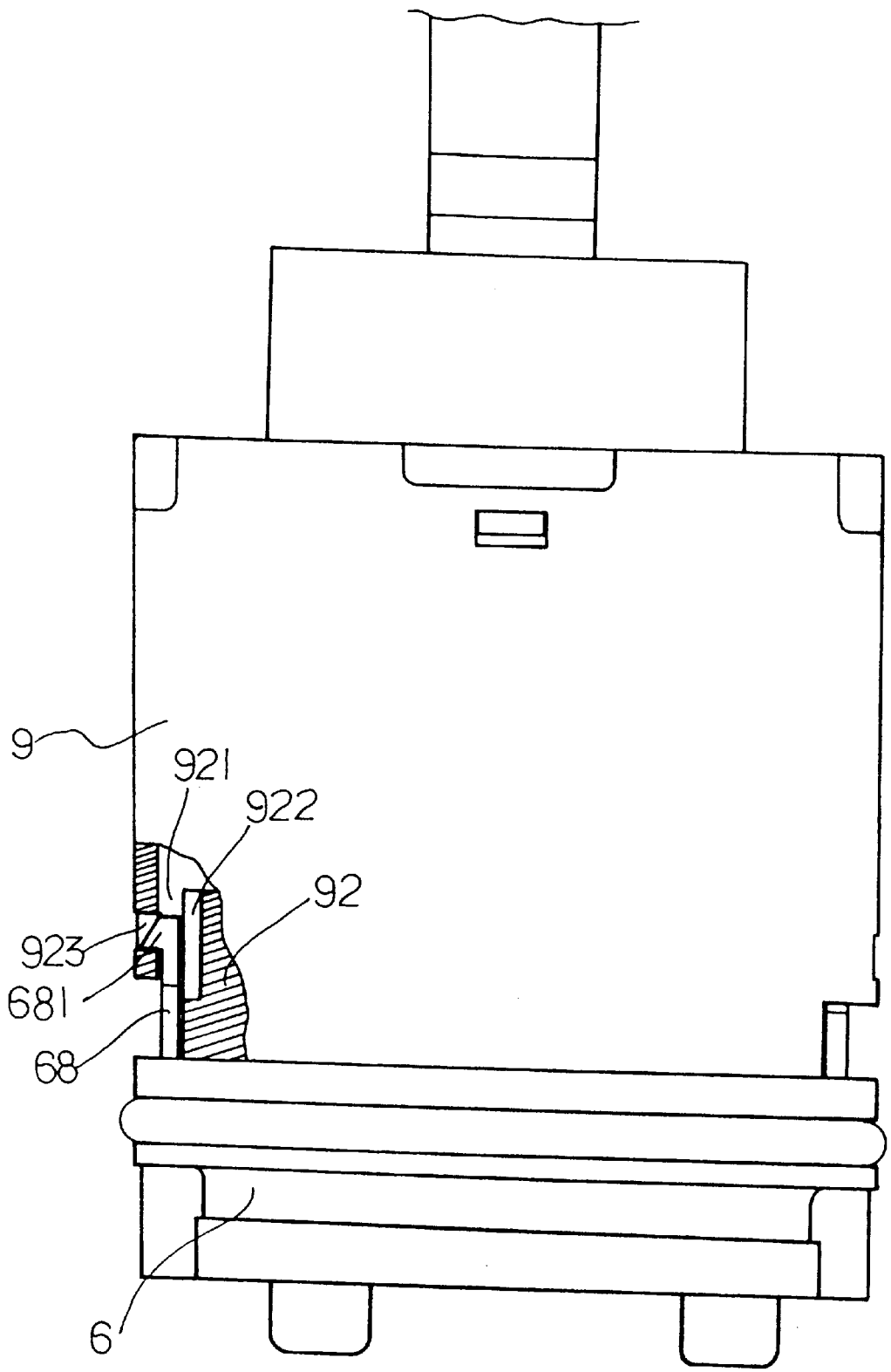
FIG. 9 is a partially sectional view of the assembly of the cartridge and the balance valve shade board of the present invention.

When assembled, the disc seal 5 is fitted into the sealing groove 93 of the bottom wall 92. Thereafter, the guide notches 41 of the fixed disc 4 cooperate with the guide rails 991, 992 of the cartridge to fit the fixed disc 4 into the cartridge 9 to fixedly press the disc seal 5. The movable disc 3 is sealedly overlaid on the fixed disc 4 with its upper end face fitted under the rocking lever control device 2. The rocking lever seat of the control device 2 is fitted with the cartridge cap 1 which is latched with upper end of the cartridge 9. Then the central ring 71 of the balance valve seal 7 is fitted around a middle section of the cylindrical body of the balance valve 8. Then the balance valve seal 7 and the balance valve 8 are inserted in the sealing groove 67 and lower balance valve cavity 65 of the upper surface of the balance valve shade board 6. Then, the resilient latch hooks 68 of the shade board 6 are fitted into the semilunar perforations 921 along the guide channels 922 to latch the hook heads 681 in the latch holes 923 of the peripheral wall of the cartridge. Accordingly, the balance valve shade board 6 together with the seal 7 and balance valve 8 are secured on the lower surface of the bottom wall 92 of the cartridge (as shown in FIG. 9).

Figure 10:
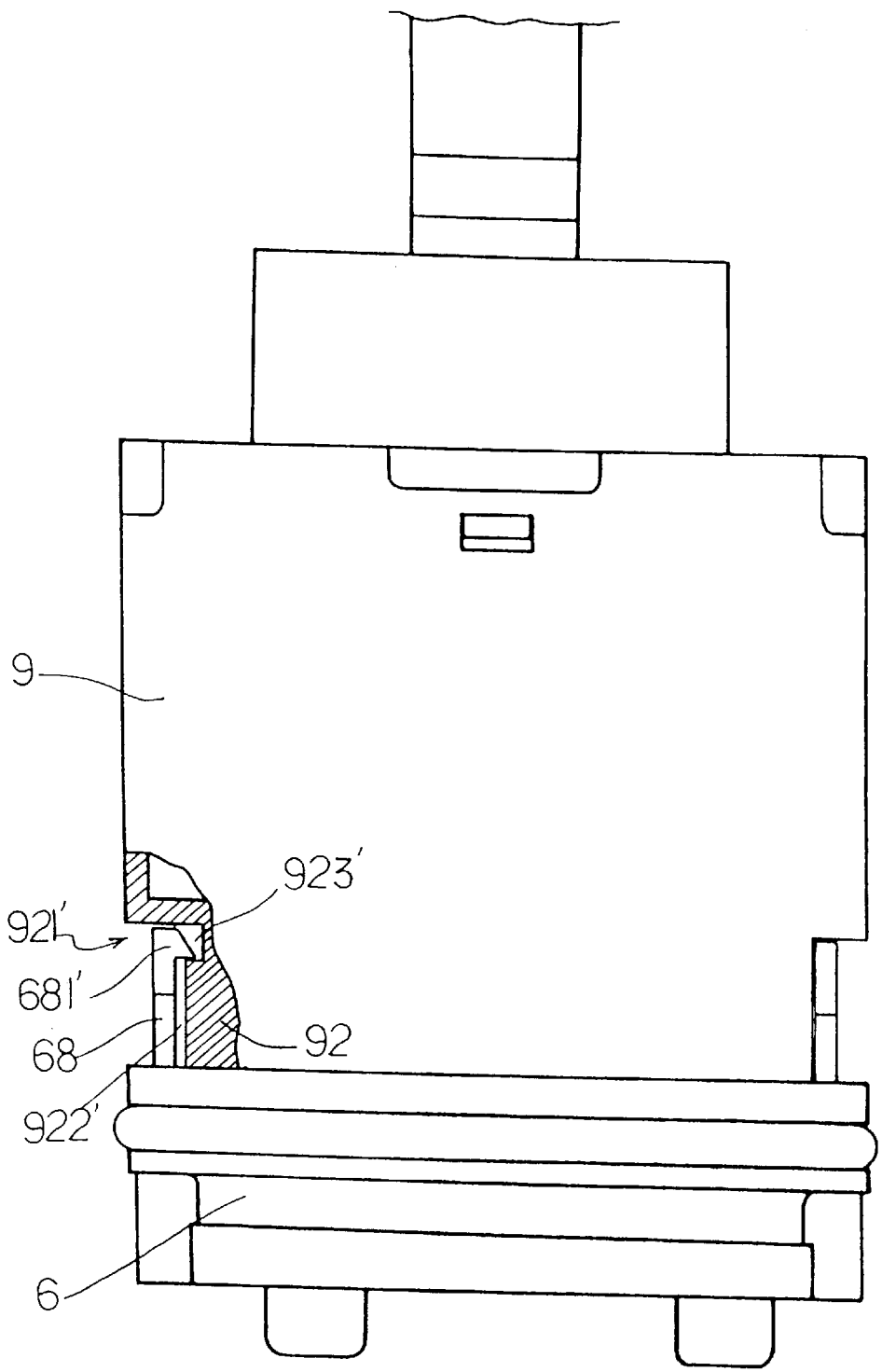
FIG. 10 is a partially sectional view of another embodiment of the assembly of the cartridge and the balance valve shade board of the present invention.
Figure 11:
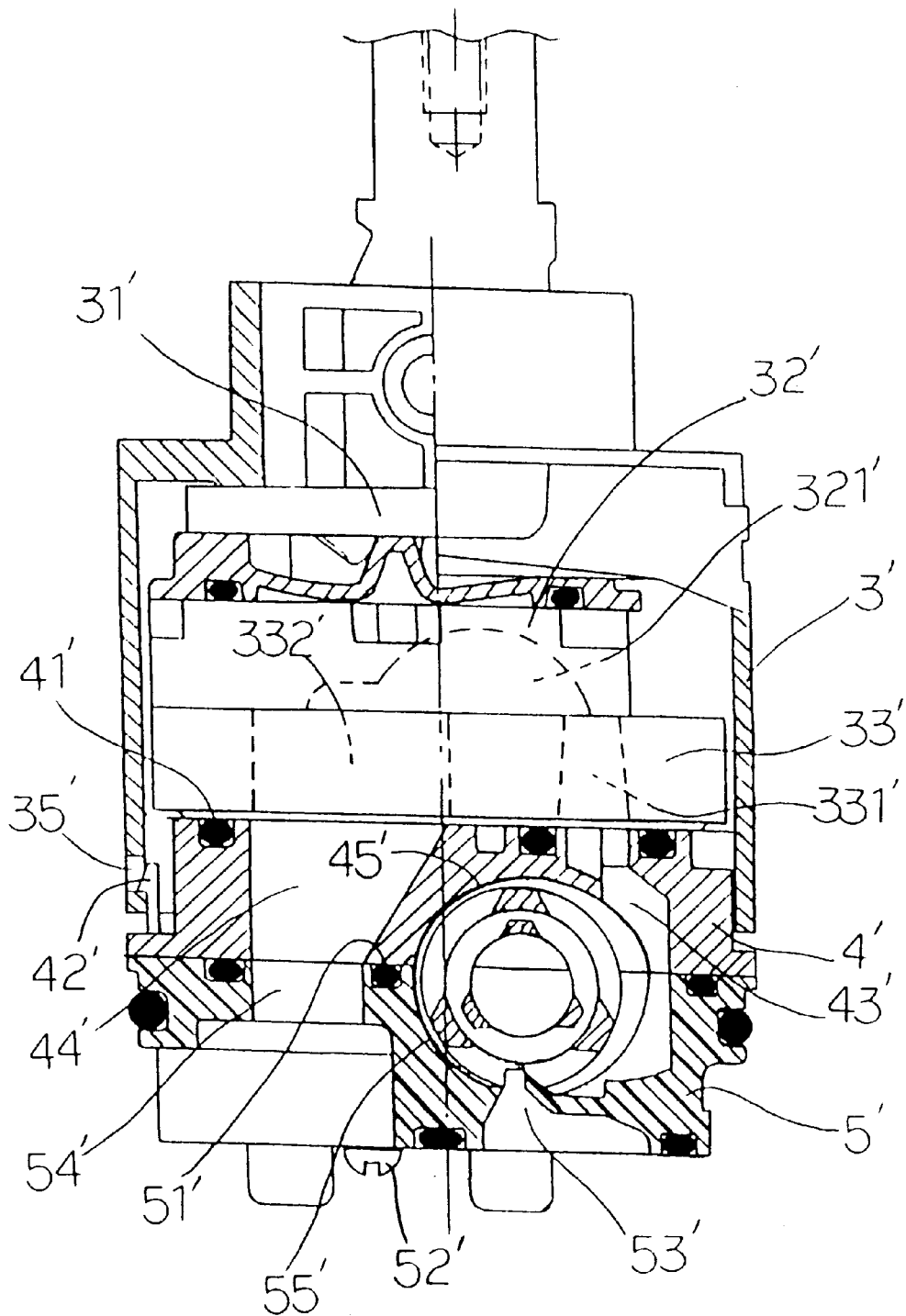
FIG. 11 is a sectional view of a conventional cold/hot water mixing valve with a balance valve.

FIG. 10 shows another embodiment of the present invention, in which the resilient latch hook 68 has an inward hook head 681' and two sides of the bottom wall 92 are disposed with two semilunar cut sections 921'. A lateral face of the bottom wall at each cut section is disposed with a guide channel 922'. A top end of the guide channel is formed with a latch hole 923'. Accordingly, the balance valve shade board 6 is inward latched and assembled with the cartridge 9 to achieve the same effect.

It should be noted that the above description and accompanying drawings are only used to illustrate some embodiments of the present invention, not intended to limit the scope thereof. Any modification of the embodiments should fall within the scope of the present invention.

What is claimed is:

1. An assembling structure for balance valve of cold/hot water mixing valve, the assembling structure including a balance valve shade board for assembling a water pressure balance valve with the bottom of the mixing valve, said assembling structure being characterized in that a lower surface of the bottom wall of the mixing valve cartridge is formed with an upper balance valve cavity near the cold and hot water incoming holes, two sides of the bottom wall of the cartridge being formed with semilunar perforations, a lateral face of the bottom wall at each perforation being formed with a guide channel, the peripheral wall of the cartridge being formed with a latch hole opposite to the guide channel, the balance valve shade board being formed with a cold and a hot water incoming holes and a mixing water outgoing hole corresponding to the water holes of the bottom wall of the cartridge, an upper surface of the balance valve shade board being formed with a lower balance valve cavity near the cold and hot water incoming holes, the upper surface of the balance valve shade board being formed with a sealing groove along the edges of the mixing water outgoing hole and the lower balance valve cavity, two sides of the edge of the shade board being disposed with upward extending resilient latch hooks each having an outward hook head at free end, whereby the balance valve seal and the balance valve are assembled with each other and then together inserted into the sealing groove and lower balance valve cavity of the upper surface of the balance valve shade board, the resilient latch hooks of the shade board being fitted into the semilunar perforations along the guide channels to latch the hook heads in the latch holes of the peripheral wall of the cartridge, so that the balance valve shade board together with the seal and balance valve are secured on the lower surface of the bottom wall of the cartridge.

* * * * *